United States Patent
Hahn et al.

(10) Patent No.: US 12,036,870 B2
(45) Date of Patent: Jul. 16, 2024

(54) DUAL-CLUTCH TRANSMISSION AND HYBRID DRIVE SYSTEM

(71) Applicant: MERCEDES-BENZ GROUP AG, Stuttgart (DE)

(72) Inventors: Peter Hahn, Stuttgart (DE); Carsten Gitt, Stuttgart (DE); Tobias Haerter, Stuttgart (DE); Jonathan Zeibig, Aalen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/024,356

(22) PCT Filed: Aug. 4, 2021

(86) PCT No.: PCT/EP2021/071774
§ 371 (c)(1),
(2) Date: Mar. 2, 2023

(87) PCT Pub. No.: WO2022/048852
PCT Pub. Date: Mar. 10, 2022

(65) Prior Publication Data
US 2023/0406089 A1    Dec. 21, 2023

(30) Foreign Application Priority Data
Sep. 3, 2020  (DE) .................. 10 2020 005 390.4

(51) Int. Cl.
*F16H 3/00*     (2006.01)
*B60K 6/48*     (2007.10)
*B60K 6/547*    (2007.10)

(52) U.S. Cl.
CPC ............. *B60K 6/547* (2013.01); *B60K 6/48* (2013.01); *F16H 3/006* (2013.01); *B60K 2006/4816* (2013.01)

(58) Field of Classification Search
CPC .. B60K 6/547; B60K 6/48; B60K 2006/4816; F16H 3/006
(Continued)

(56) References Cited

U.S. PATENT DOCUMENTS 8,342,048 B2    1/2013  Rieger
9,453,558 B2 *  9/2016  Wittkopp ................ F16H 3/093
(Continued)

FOREIGN PATENT DOCUMENTS

DE    102007049270 A1    4/2009
DE    102009002353 A1    10/2010
(Continued)

OTHER PUBLICATIONS

International Search Report and Written Opinion mailed Oct. 4, 2021 in related/corresponding International Application No. PCT/EP2021/071774.
(Continued)

*Primary Examiner* — Ha Dinh Ho
(74) *Attorney, Agent, or Firm* — PATENT PORTFOLIO BUILDERS PLLC

(57) ABSTRACT

A dual-clutch transmission includes first and second partial transmissions, a first countershaft to which a first output gear is permanently connected in a rotationally fixed manner, and a second countershaft to which a second output gear is permanently connected in a rotationally fixed manner. A first idler assigned to the first partial transmission and a second idler assigned to the second partial transmission are respectively arranged coaxially to the first countershaft and are couplable to each other in a rotationally fixed manner by a bridge switching element. The first partial transmission includes exactly three single-gear planes, including a first single-gear plane, second single-gear plane having the first idler, and third single-gear plane. The second partial trans-
(Continued)

mission includes exactly two single-gear planes, including a fourth single-gear plane having the second idler and a fifth single-gear plane, and which is equipped such that eight transmission gears can be implemented with a falling transmission ratio.

5 Claims, 1 Drawing Sheet

(58) Field of Classification Search
USPC .......................................................... 74/330
See application file for complete search history.

(56) References Cited

U.S. PATENT DOCUMENTS

| | | | | |
|---|---|---|---|---|
| 9,958,032 | B2* | 5/2018 | Eo | ............................ F16H 3/006 |
| 11,293,526 | B2 | 4/2022 | Gitt et al. | |
| 2008/0245166 | A1* | 10/2008 | Baldwin | .................. F16H 3/006 |
| | | | | 74/331 |
| 2010/0257963 | A1* | 10/2010 | Rieger | .................... F16H 3/006 |
| | | | | 74/331 |
| 2015/0285340 | A1* | 10/2015 | Kim | ........................ F16H 3/006 |
| | | | | 74/330 |

FOREIGN PATENT DOCUMENTS

| | | |
|---|---|---|
| DE | 102010055645 A1 | 6/2012 |
| DE | 102012022777 A1 | 5/2014 |
| DE | 102013009310 A1 | 12/2014 |
| DE | 102019004762 B3 | 7/2020 |

OTHER PUBLICATIONS

Office Action created Jun. 21, 2021 in related/corresponding DE Application No. 10 2020 005 390.4.

* cited by examiner

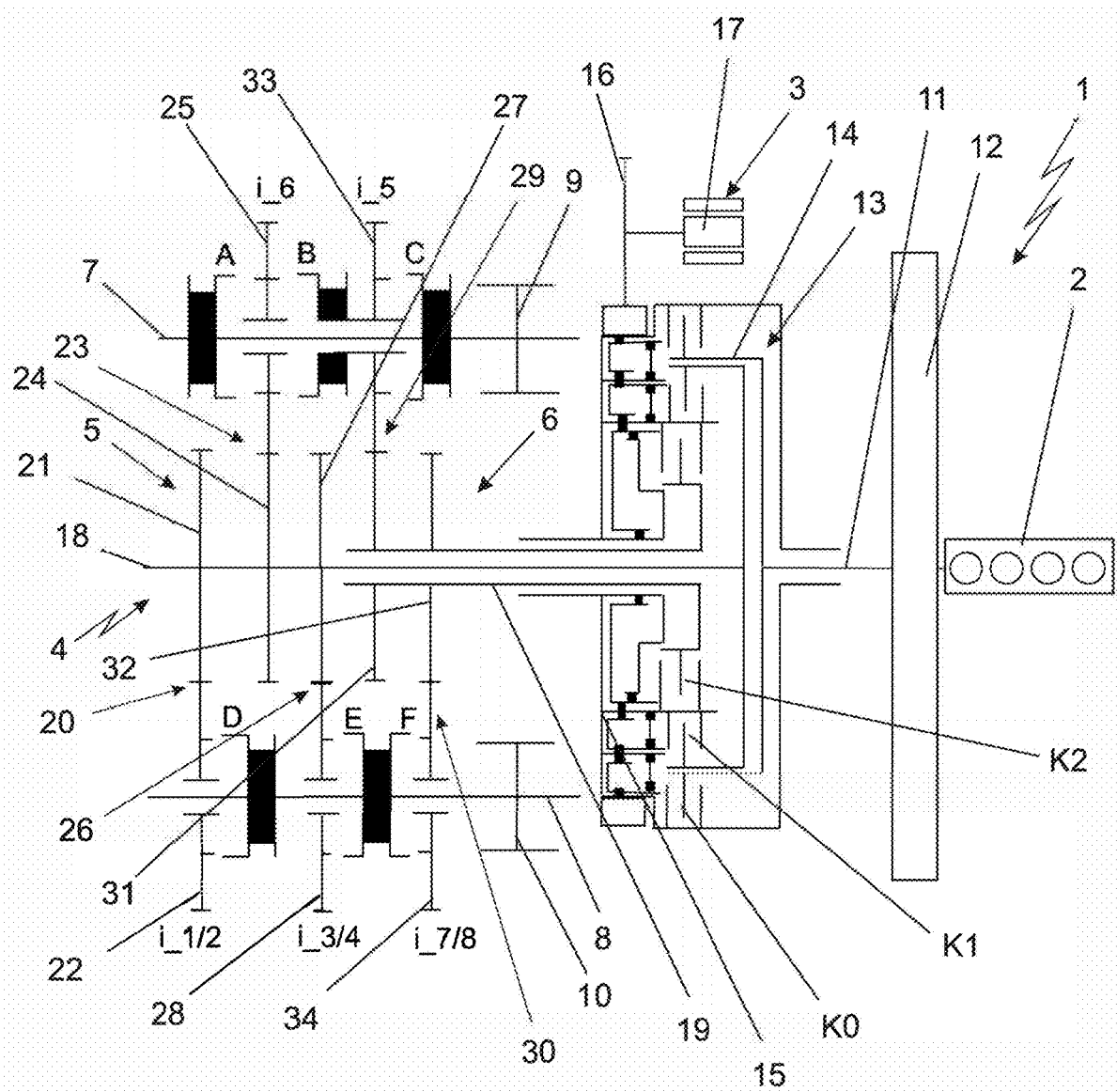

DUAL-CLUTCH TRANSMISSION AND HYBRID DRIVE SYSTEM

BACKGROUND AND SUMMARY OF THE INVENTION

Exemplary embodiments of the invention relate to a dual-clutch transmission having a first partial transmission and a second partial transmission.

DE 10 2009 002 353 A1 discloses a dual-clutch transmission suitable for a hybrid drive system. This transmission can switch eight gears and has a bridge switching element between the idlers for the third and fourth gear. The two idlers that can be connected via the bridge switching element are assigned to different partial transmissions. A single-gear plane of the next lower gear is enclosed between them, wherein the single-gear plane abuts on the partial transmission of the idler in the higher gear of the two idlers that can be connected via the bridge switching element. A mechanical reverse gear is provided in addition to the eight forward gears. Overall, the structure of the transmission is relatively large, particularly in the axial direction, and thus in the axis direction of the partial transmission input shafts and parallel countershafts.

Dual-clutch transmissions with suitability for hybrid drive systems are further known from the prior art, particularly from DE 10 2010 055 645 A1, DE 10 2013 009 310 A1 and DE 10 2019 004 762 B3.

Exemplary embodiments of the present invention are directed an improved dual-clutch transmission having eight forward gears that can be implemented more compactly, particularly in the axial construction direction.

A dual-clutch transmission having a first partial transmission to which a first clutch and a first partial transmission input shaft are assigned is described. A second partial transmission is further comprised, to which a second clutch and a second partial transmission input shaft are assigned. The dual-clutch transmission further comprises a first countershaft, to which a first output gear is permanently connected in a rotationally fixed manner, and a second countershaft, to which a second output gear is permanently connected in a rotationally fixed manner. A first idler assigned to the first partial transmission and a second idler assigned to the second partial transmission are respectively arranged coaxially to the first countershaft, and can be coupled to each other in a rotationally fixed manner by means of a bridge switching element.

The dual-clutch transmission according to the invention comprises exactly three single-gear planes in the first partial transmission, specifically a first single-gear plane, a second single-gear plane and a third single-gear plane, wherein the second single-gear plane comprises the first idler, which can be coupled to the second idler via the bridge switching element. The second partial transmission then comprises exactly two single-gear planes, specifically a fourth single-gear plane and a fifth single-gear plane, wherein the fourth single-gear plane comprises the second idler.

The first clutch and the second clutch form a dual clutch together.

The element being arranged coaxially to a shaft means that the element is arranged coaxially to an axis of rotation of the shaft.

A connection of two rotatably mounted elements in a rotationally fixed manner means that the two elements are arranged coaxially to one another and are connected to each other such that they rotate with the same angular velocity.

By a switching element is meant a device by means of which an idler can be connected to a shaft arranged coaxially to the idler in a rotationally fixed manner. The switching element has a switched state for the rotationally fixed connection. The switching element has a non-switched state for releasing the rotationally fixed connection. The switching element advantageously has a claw gearing, and potentially a synchronizing device.

By the single-gear plane is meant a gear plane in which exactly one gear wheel pairing consisting of exactly two gear wheels intermeshing with each other is arranged.

Eight transmission gears designed as forward gears, specifically a first transmission gear to an eighth transmission gear, can thus be implemented with a transmission ratio that falls according to the sequence of numbering. The structure can be implemented exceptionally easily and compactly in the axial direction. By no longer requiring gear planes having several gears, and consequently the use of the specified number of three single-gear planes in the first partial transmission and two single-gear planes in the second partial transmission, the structure becomes correspondingly simple. The disadvantage that no switching is possible under load between two discrete gears, as the gears required for this purpose abut on the same partial transmission and thus cannot be pre-set, is acceptable given the distinct advantages with regard to the axial construction length.

The dual-clutch transmission having its eight transmission gears, all of which are formed as forward gears, can, for example, be installed as an eight-gear transmission or as a six-gear transmission having two crawler gears, both of which are also designed as forward gears. Due to its compact length, it can be installed in particular transversely to the direction of travel, which is a particularly distinct advantage with regard to the packaging.

According to an advantageous development of the dual-clutch transmission according to the invention, it can specifically be provided that a first switching element is equipped to connect the first single-gear plane to the second countershaft in a torque-transferring manner in order to form the first transmission gear and also in order to form the second transmission gear.

A change between these two transmission gears can thus be implemented in a manner able to be shifted under load via a clutch change in the dual clutch. By means of the bridge switching element, a winding gear in which both partial transmissions are used can be implemented.

According to a further very advantageous embodiment, it can further be provided that a second switching element is provided, which is equipped to connect the second single-gear plane to the first countershaft in a torque-transferring manner in order to form the sixth transmission gear.

A third switching element also serves to connect the third single-gear plane in order to form the third gear and in order to form the fourth gear in which a torque-transferring connection to the second countershaft takes place. As for the first and second transmission gears, one of these gears, specifically the fourth transmission gear, is designed as a winding gear in turn. A gear change from the third transmission gear to the fourth transmission gear occurs in a manner able to be shifted under load via a clutch change in the dual clutch.

A fourth switching element can be provided according to an advantageous embodiment to connect the fourth single-gear plane to the first countershaft in a torque-transferring manner in order to form the fifth transmission gear.

According to an extremely favorable embodiment of the dual-clutch transmission, a fifth switching element is then provided to connect the fifth single-gear plane to the second countershaft in a torque-transferring manner in order to form the seventh transmission gear and in order to form the eighth transmission gear. The bridge switching element is also used here to correspondingly form one of the two gears via the winding gear when the fifth switching element is switched.

A very advantageous development of the dual-clutch transmission according to the invention provides that the first, second, third, fourth, and fifth single-gear plane and the first clutch are arranged axially one after the other in the specified sequence. This arrangement, which contributes to the compactness of the structure, ultimately means that the first partial transmission input shaft is designed as a solid shaft and the second partial transmission input shaft as a hollow shaft, which also contributes to the compact structure.

As already mentioned above, a hybrid drive system for a vehicle can comprise such a dual-clutch transmission in one of the described embodiment variants. It further comprises an internal combustion engine and an electric engine, wherein it is provided according to the invention, in the case of the hybrid drive system, that the internal combustion engine is or can be coupled at least indirectly with an input shaft of the dual-clutch transmission. An indirect coupling means that devices for damping and absorbing torsional vibrations, for example a dual-mass flywheel, a torsional vibration damper or the like, are arranged between the crankshaft of the internal combustion engine and the input shaft of the dual-clutch transmission. The internal combustion engine can additionally be coupled and uncoupled via a separating clutch, which can be implemented together with the dual clutch as an integrated clutch component.

According to a very advantageous development of the hybrid drive system according to the invention, it can further be provided that this same separating clutch is provided between the input shaft of the dual-clutch transmission and the dual clutch, the input side of the separating clutch being connected to the input shaft and the output side to the dual clutch, which comprises a first and a second clutch in turn. The above-mentioned integrated clutch component is thus created.

In a further extremely favorable embodiment, it can further be provided that a rotor of the electric engine is connected to the output side of the separating clutch, preferably via a transmission element, such as a pinion, chain, belt, or also a complete switchable transmission. The connection particularly preferably occurs via a single pinion in order to correspondingly drive the dual-clutch transmission, and ultimately its output shaft or its two output gears, as is usual for dual-clutch transmissions. This possibility of driving the dual-clutch transmission electrically independently of the internal combustion engine when the separating clutch is open, and thus of driving a vehicle equipped with the dual-clutch transmission or the hybrid drive system purely electrically, also creates the possibility of compensating for the lack of mechanical reverse gear by the drive being achieved via the electric engine in the event of the vehicle being driven backwards.

Further advantageous embodiments of the dual-clutch transmission according to the invention and of the hybrid drive system according to the invention result from the exemplary embodiments, which are explained in more detail in the following with reference to the FIGURE.

BRIEF DESCRIPTION OF THE SOLE DRAWING FIGURE

The sole FIGURE shows a conceivable exemplary embodiment of a hybrid drive system according to the invention having a dual-clutch transmission in an embodiment according to the invention.

DETAILED DESCRIPTION

The sole FIGURE illustrates a hybrid drive system 1 comprising an internal combustion engine 2 and an electric engine 3. The hybrid drive system 1 additionally comprises a dual-clutch transmission 4 split into a first partial transmission 5 and a second partial transmission 6. An output drive not depicted here is driven via a first countershaft 7 and a second countershaft 8 having output gears respectively arranged thereon in a rotationally fixed manner, specifically a first output gear 9 and a second output gear 10, for example a gear wheel coupled to an output shaft or a gear wheel connected to a differential cage in a rotationally fixed manner.

A dual-mass flywheel 12 is arranged in the force flow starting from the internal combustion engine 2 between a crankshaft of the internal combustion engine 2 and an input shaft 11 of the dual-clutch transmission 4, the dual-mass flywheel serving to absorb or damp torsional vibrations. This is followed by the clutch component 13, which comprises the actual dual clutch having a first clutch K1 and a second clutch K2, and a separating clutch K0. An input side 14 of the separating clutch K0 is connected to the input shaft 11 of the dual-clutch transmission 4. An output side 15 of the separating clutch K0 is additionally connected to a rotor 17 of the electric engine 3 via a pinion 16. The output side 15 of the separating clutch K0 is additionally respectively connected to input sides of the two clutches K1 and K2 of the dual clutch, which can connect this output side 15 to a first partial transmission input shaft 18 of the first partial transmission 5 and a second partial transmission input shaft 19 of the second partial transmission 6. The first partial transmission input shaft 18 is designed as a solid shaft, the second partial transmission input shaft 19 surrounds the first partial transmission shaft as a hollow shaft. The two partial transmission shafts 18, 19 are arranged coaxially to one another.

Three single-gear planes are assigned to the first partial transmission 5 and thus to the first partial transmission input shaft 18. A first single-gear plane 20 comprises a fixed gear 21 that is arranged coaxially to the first partial transmission input shaft 18 and is connected to the first partial transmission input shaft 18 in a rotationally fixed manner, and a third idler 22 arranged coaxially to the second countershaft 8, and able to be connected to the second countershaft via a first switching element D. A second single-gear plane 23 having a second fixed gear 24 connected to the first partial transmission input shaft 18 in a rotationally fixed manner that correspondingly intermeshes with a first idler 25 arranged coaxially to the first countershaft 7, the second single-gear plane also being assigned to the first partial transmission 5, then follows in the axial direction of the partial transmission input shafts 18, 19. A second switching element A is provided to couple this first idler 25 with the first countershaft 7 in a rotationally fixed manner.

A third single-gear plane 26 is also assigned to the first partial transmission 5. A third fixed gear 27 of this third single-gear plane 26 is correspondingly connected to the first partial transmission shaft 18 in a rotationally fixed manner. It intermeshes with a fourth idler 28, which is in turn arranged coaxially to the second countershaft 8. This fourth idler 28 can be connected to the second countershaft 8 in a switchable and rotationally fixed manner via a third switching element E.

Two further single-gear planes, specifically a fourth single-gear plane 29 and a fifth single-gear plane 30 are assigned to the second partial transmission 6. Each of these single-gear planes has fixed gears, specifically a fourth fixed gear 31 and a fifth fixed gear 32 that are connected to the second partial transmission input shaft 19 formed as a hollow shaft in a rotationally fixed manner. The fourth fixed gear 31 of the fourth single-gear plane 29 intermeshes with a second idler 33, which can in turn be connected to the first countershaft 7 in a rotationally fixed manner via a fourth switching element C. In the fifth single-gear plane 30, its fifth fixed gear 32 intermeshes with a fifth idler 34, which is in turn arranged coaxially to the second countershaft 8. This fifth idler 34 can be connected to the second countershaft 8 as needed in a rotationally fixed manner via a fifth switching element F.

In addition to the elements described, the hybrid drive system 1 or its dual-clutch transmission 4 additionally comprises a bridge switching element B that is arranged axially between the first idler 25 and the second idler 33, and can connect the first and second idlers to each other in a rotationally fixed manner as needed, without these two idlers 25, 33 simultaneously being connected to the first countershaft 7 in a rotationally fixed manner. As the first idler 25 is assigned to the first partial transmission 5 and the second idler 33 is assigned to the second partial transmission 6, a winding gear results in the case of the switched bridge switching element B.

In a switching state in which the first idler 25 and the second idler 33 are connected to each other in a rotationally fixed manner by means of the bridge switching element B, the first idler 25 and the second idler 33 can always be rotated relative to the first countershaft 7.

The first countershaft 7 and the second countershaft 8 are arranged in parallel with each other and in parallel with the input shaft 11. The rotor 17 is advantageously not arranged coaxially, but rather also in parallel with and axially offset from the input shaft 11. In combination with the wheelset features, the hybrid drive system 1 can thus be constructed very short axially overall.

Only eight forward gears can correspondingly be implemented with the structure. The transmission ratios and the size or number of teeth of the individual gear wheels installed in the dual-clutch transmission 4 are then coordinated with the corresponding transmission ratios to thus create, for example, eight forward gears having transmission ratios that fall in the sequence of their numbering, or, for example, six forward gears of this kind and two crawler gears conceived as forward gears, depending on the purpose of the hybrid drive system 1.

The switching process can now be designed as can be seen from the gears notated on the respective idlers 22, 25, 28, 33 and 34 $i\_n$. When the first switching element D is closed, a first gear would result in the case of a closed switch element B and a drive via the second partial transmission 6, and thus a closed clutch K2. The first gear is designed as a winding gear, the drive of which takes place via the first partial transmission 6 if the clutch K2 is closed, and the output of which takes place via the second partial transmission 5 and the second countershaft 8 with its second output gear 10.

To change from the first transmission gear to the second transmission gear, this winding gear is released by correspondingly changing the clutches K2, K1. The first two transmission gears can thus be implemented via the first switching element D and the third idler 22. The bridge switching element B can be released during this change. It is possible to change between the first gear and the second gear without interrupting load.

The bridge switching element B is engaged again if it was previously released and the third switching element E connects the fourth idler 28 to the second countershaft 8 to change to the third gear. Advantageously, however, the bridge switching element B remains engaged when changing from the second transmission gear to the third transmission gear. This third transmission gear is correspondingly also designed as a winding gear, such that the clutch K2 is closed and the clutch K1 is opened.

The fourth transmission gear is then implemented via a new clutch change by opening the second clutch K2 and closing the first clutch K1.

In order to change from the fourth transmission gear to the fifth transmission gear, the bridge switching element B must first be disengaged if it is not already disengaged. The fifth transmission gear can then be prepared starting from the fourth gear by closing the switching element C and being re-coupled into this gear during the change. The second switching element A is engaged and re-coupled again for the sixth gear. The same applies to the fifth switching element F for the seventh gear. To change from the seventh gear to the eighth gear, a winding gear is provided again, which is engaged by engaging the bridge switching element B and re-coupling the clutches K1, K2 of the dual clutch.

A mechanical reverse gear does not exist. Switching from the second to the third gear under load is likewise impossible, but these two limitations are acceptable considering the exceptionally compact structure in the axial direction. The electric engine 3 can implement an electric reverse gear and synchronize the elements involved as needed during a change from the second to the third gear.

In the case of altered sizes and transmission ratios of the gear wheels, an alternative embodiment of the hybrid drive system 1 could also provide that a structure takes the place of engaging the third and fourth gear via the third single-gear plane 26, in the case of which two crawler gears can be engaged via this third single-gear plane 26 and the fourth idler 28 assigned to the latter. The crawler gears C1/C2 would take the place of the gears 3 and 4 in the depiction of the sole FIGURE, which would then be switched as a winding gear and a direct gear analogously to the gears 3 and 4 in the description above. In this case, the third gear would be implemented via the second idler 33 of the fourth single-gear plane 29, and the fourth gear via the first idler 25 of the second single-gear plane 23. The remaining gears 5 and 6 would then be implemented analogously to the gears 7 and 8 in the exemplary embodiment described above via the fifth idler 34 of the fifth single-gear plane 30 using a winding gear. The structure could then be implemented practically identically to the structure described above, with the exception of the selected gear sizes and numbers of teeth, wherein the two crawler gears C1/C2 take the place of the gears 3 and 4, the gear 3 takes the place of the gear 5, the gear 4 takes the place of the gear 6 and the gears 5/6 take the place of the gears 7/8.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A dual-clutch transmission, comprising:
a first partial transmission to which a first clutch and a first partial transmission input shaft are assigned;
a second partial transmission to which a second clutch and a second partial transmission input shaft are assigned;
a first countershaft to which a first output gear is permanently connected in a rotationally fixed manner;
a second countershaft to which a second output gear is permanently connected in a rotationally fixed manner; and
a first idler assigned to the first partial transmission and a second idler assigned to the second partial transmission are respectively arranged coaxially to the first countershaft and are couplable to each other in a rotationally fixed manner by a bridge switching element,
wherein the first partial transmission comprises exactly three single-gear planes, the three single-gear planes of the first partial transmission are a first single-gear plane, a second single-gear plane comprising the first idler, and a third single-gear plane, and the first, second, and third single-gear planes each have exactly one gear wheel pairing consisting of exactly two gear wheels intermeshing with each other,
wherein the second partial transmission comprises exactly two single-gear planes, wherein the two single-gear planes of the second transmission are a fourth single-gear plane comprising the second idler, and a fifth single-gear plane, wherein the fourth and fifth single-gear planes each have exactly one gear wheel pairing consisting of exactly two gear wheels intermeshing with each other, and wherein the second partial transmission is configured such that a first transmission gear, a second transmission gear, a third transmission gear, a fourth transmission gear, a fifth transmission gear, a sixth transmission gear, a seventh transmission gear, and an eighth transmission gear are formable with a transmission ratio decreasing according to a sequence of a numbering of the first through eighth transmission gears,
wherein a first switching element is configured to connect a third idler of the first single-gear plane arranged coaxially to the second countershaft to the second countershaft in a rotationally fixed manner to form the first transmission gear and to form the second transmission gear,
wherein a second switching element is configured to connect the first idler of the second single-gear plane arranged coaxially to the first countershaft to the first countershaft in a rotationally fixed manner to form the sixth transmission gear,
wherein a third switching element is configured to connect a fourth idler of the third single-gear plane arranged coaxially to the second countershaft to the second countershaft in a rotationally fixed manner to form the third transmission gear and to form the fourth transmission gear,
wherein a fourth switching element is configured to connect the second idler of the fourth single-gear plane to the first countershaft in a rotationally fixed manner to form the fifth transmission gear, and
wherein a fifth switching element is configured to connect a fifth idler of the fifth single-gear plane to the second countershaft in a rotationally fixed manner to form the seventh transmission gear and to form the eighth transmission gear.

2. The dual-clutch transmission of claim 1, wherein the first single-gear plane, the second single-gear plane, the third single-gear plane, the fourth single-gear plane, the fifth single-gear plane, and a clutch component comprising the first clutch and the second clutch are axially arranged one after in a specified sequence, wherein the specified sequence is the first single-gear plane, the second single-gear plane, the third single-gear plane, the fourth single-gear plane, the fifth single-gear plane, and the clutch component.

3. A hybrid drive system, comprising:
an internal combustion engine;
an electrical engine; and
a dual-clutch transmission, comprising
a first partial transmission to which a first clutch and a first partial transmission input shaft are assigned;
a second partial transmission to which a second clutch and a second partial transmission input shaft are assigned;
a first countershaft to which a first output gear is permanently connected in a rotationally fixed manner;
a second countershaft to which a second output gear is permanently connected in a rotationally fixed manner; and
a first idler assigned to the first partial transmission and a second idler assigned to the second partial transmission, which are respectively arranged coaxially to the first countershaft and are couplable to each other in a rotationally fixed manner by a bridge switching element,
wherein the first partial transmission comprises exactly three single-gear planes, the three single-gear planes of the first partial transmission are a first single-gear plane, a second single-gear plane comprising the first idler, and a third single-gear plane, and the first, second, and third single-gear planes each have exactly one gear wheel pairing consisting of exactly two gear wheels intermeshing with each other,
wherein the second partial transmission comprises exactly two single-gear planes, wherein exactly one gear wheel pairing consisting of exactly two gear wheels intermeshing with each other is arranged in both of the exactly two single-gear planes, wherein the two-single gear planes of the second partial transmission are the second idler and a fifth single-gear plane, and wherein the second partial transmission is configured such that a first transmission gear, a second transmission gear, a third transmission gear, a fourth transmission gear, a fifth transmission gear, a sixth transmission gear, a seventh transmission gear, and an eighth transmission gear are formable with a transmission ratio decreasing according to a sequence of a numbering of the first through eighth transmission gears,
wherein a first switching element is configured to connect a third idler of the first single-gear plane arranged coaxially to the second countershaft to the second countershaft in a rotationally fixed manner to form the first transmission gear and to form the second transmission gear, wherein a second switching element is configured to connect the first idler of the second single-gear plane arranged coaxially to the first countershaft to the first countershaft in a rotationally fixed manner to form the sixth transmission gear, wherein a third switching element is configured to connect a fourth idler of the third single-gear plane arranged coaxially to the second countershaft to the second countershaft in a rotationally fixed manner to form the third transmission gear and to form the fourth transmission gear, wherein a fourth switching element is configured to connect the second idler of the fourth single-gear plane to the first countershaft in a rotationally fixed manner to form the fifth transmission gear, and wherein a fifth switching element is configured to connect a fifth idler of the fifth single-gear plane to the second countershaft in a rotationally fixed manner to form the seventh transmission gear and to form the eighth transmission gear, wherein the internal combustion engine is at least indirectly couplable with an input shaft of the dual-clutch transmission.

4. The hybrid drive system of claim 3, further comprising:
a separating clutch arranged between the input shaft and the dual clutch, wherein an input side of the separating clutch is coupled to the input shaft and an output side of the separating clutch is coupled to the dual clutch, comprising a first clutch and a second clutch.

5. The hybrid drive system of claim 4, wherein a rotor of the electric engine is connected to the output side of the separating clutch via a transmission element.

* * * * *